(12) United States Patent
Kuhara

(10) Patent No.: US 6,948,865 B2
(45) Date of Patent: Sep. 27, 2005

(54) OPTICAL MODULE AND METHOD OF MANUFACTURING THE SAME

(75) Inventor: Yoshiki Kuhara, Osaka (JP)

(73) Assignee: Sumitomo Electric Industries, Ltd., Osaka (JP)

( * ) Notice: Subject to any disclaimer, the term of this patent is extended or adjusted under 35 U.S.C. 154(b) by 0 days.

(21) Appl. No.: 10/794,386

(22) Filed: Mar. 5, 2004

(65) Prior Publication Data

US 2004/0228586 A1 Nov. 18, 2004

(30) Foreign Application Priority Data

Mar. 7, 2003 (JP) ......................................... 2003-062311
Feb. 24, 2004 (JP) ......................................... 2004-048543

(51) Int. Cl.⁷ ............................... G02B 6/32; G02B 6/35
(52) U.S. Cl. .............................. 385/93; 385/33; 385/88; 385/89; 385/92; 385/94
(58) Field of Search ..................................... 385/88–94

(56) References Cited

U.S. PATENT DOCUMENTS

| | | | | |
|---|---|---|---|---|
| 5,555,334 A | * | 9/1996 | Ohnishi et al. ................ | 385/93 |
| 5,841,562 A | | 11/1998 | Rangwala et al. | |
| 6,040,934 A | * | 3/2000 | Ogusu et al. ................ | 398/139 |
| 6,318,908 B1 | * | 11/2001 | Nakanishi et al. ............. | 385/89 |
| 6,652,158 B2 | * | 11/2003 | Bartur et al. .................. | 385/92 |
| 6,726,370 B2 | * | 4/2004 | Shimotsu ...................... | 385/78 |

FOREIGN PATENT DOCUMENTS

JP 10093133 4/1998

* cited by examiner

Primary Examiner—Frank G. Font
Assistant Examiner—Charlie Peng
(74) Attorney, Agent, or Firm—Fish & Richardson P.C.

(57) ABSTRACT

An optical module for inputting and outputting light in a direction of a predetermined axis, and a method of manufacturing the optical module are provided. The optical module includes a stem having a mount and a principal surface crossing the predetermined axis. The mount has a first mounting surface, a second mounting surface, and an optical path. An optical filter is attached to the mount. A semiconductor light emitting device emitting light of a first wavelength is disposed on the first mounting surface and is optically coupled to the optical filter. A semiconductor light receiving device being responsive to light of a second wavelength is positioned on the second mounting surface in alignment with the optical path and is optically coupled to the optical filter through the optical path, thereby receiving the light of the second wavelength from the optical filter.

11 Claims, 17 Drawing Sheets

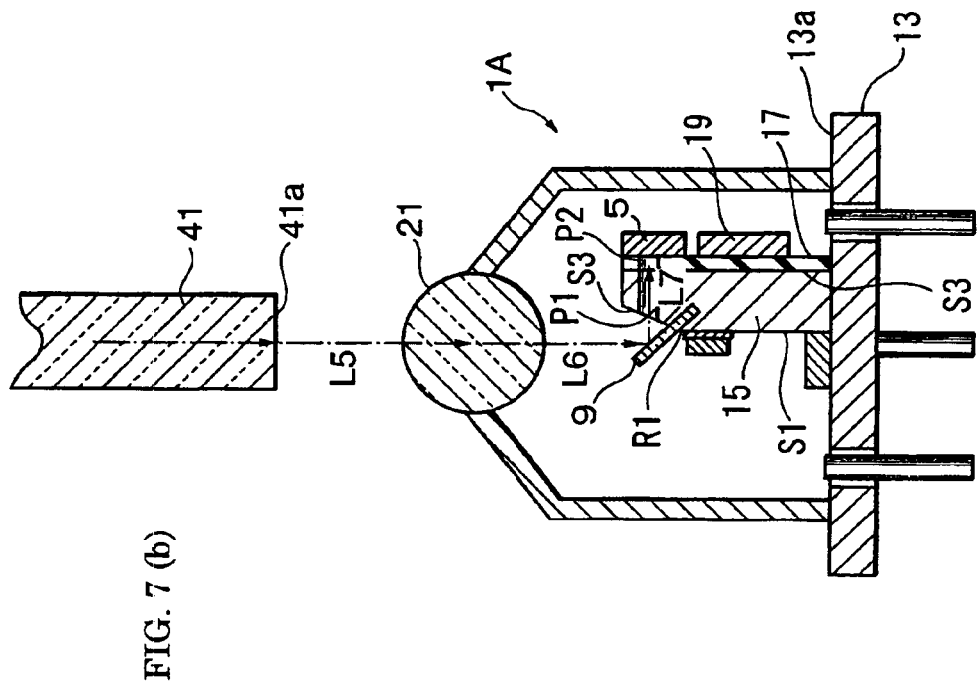
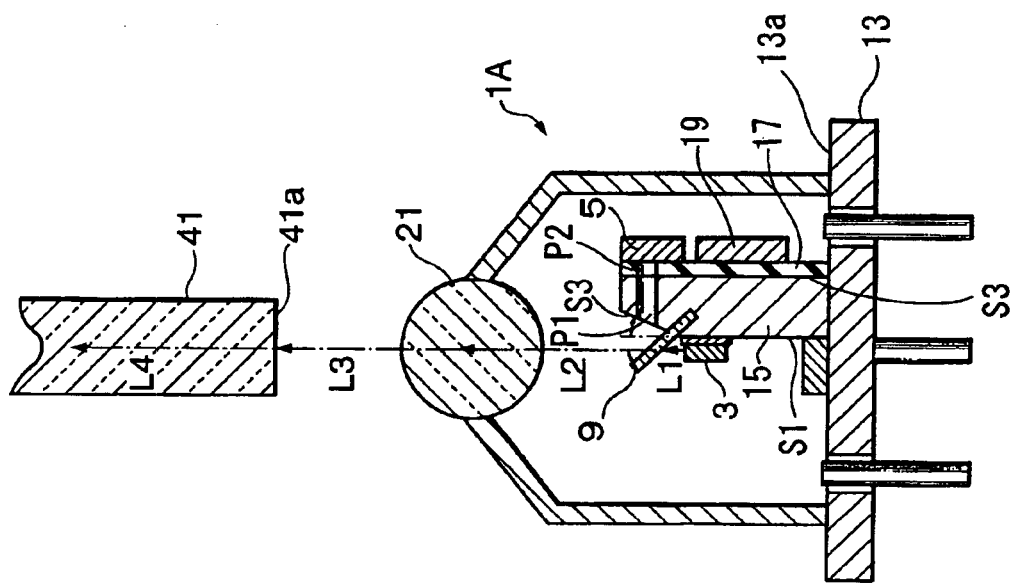

OPTICAL MODULE AND METHOD OF MANUFACTURING THE SAME

BACKGROUND OF THE INVENTION

1. Field of the Invention

The present invention relates to an optical module and a method of manufacturing the optical module.

2. Description of the Related Art

Japanese Unexamined Patent Application Publication No. 10-93133 discloses a conventional optical module 101 shown in FIG. 17. The optical module 101 has an optical transmission module 102 having a housing 102b, an optical receiver module 103 having another housing 103b, and a wavelength division multiplex filter 104. The optical transmission module 102 has a light emitting device 102a in the housing 102b. The optical receiver module 103 has a light receiving device 103a in the housing 103b. The light emitting device 102a emits light such that the emitted light passes through the wavelength division multiplex filter 104 and is supplied to an optical fiber 105. On the other hand, the light receiving device 103a is arranged such that light having traveled through an optical fiber 105 is incident thereon by being reflected at the wavelength division multiplex filter 104. The optical module 101 is obtained by assembling the optical transmission module 102, the optical receiver module 103, and the wavelength division multiplex filter 104 into a housing 106. The optical module 101 is capable of transmitting and receiving light.

Thus, the optical module 101 has the housing 102b for the optical transmission module 102, the housing 103b for the optical receiver module 103, and the housing 106 in which the wavelength division multiplex filter 104 and both the modules 102 and 103 are assembled. Because of the optical module 101 requiring those many housings, it is not easy to reduce the size of the optical module 101.

SUMMARY OF THE INVENTION

With the view of overcoming the problem mentioned above, it is an object of the present invention to provide an optical module having a structure which allows the reduction in size, and also to provide a method of manufacturing such optical module.

To achieve the above object, the present invention provides an optical module for inputting and outputting light in a direction of a predetermined axis, comprising (a) a stem having a principal surface crossing the predetermined axis and a mount disposed on the principal surface, the mount having a first mounting surface extending along a first reference plane which extends in a direction parallel to an axis crossing the principal surface, a second mounting surface extending along a second reference plane which extends in a direction parallel to an axis crossing the principal surface, and an optical path defined by a plane laterally extending from the second mounting surface in a direction crossing the predetermined axis; (b) an optical filter attached to the mount, the optical filter having a first surface and a second surface; (c) a semiconductor light emitting device disposed on the first mounting surface and emitting light of a first wavelength, the semiconductor light emitting device being optically coupled to the first surface of the optical filter, and (d) a semiconductor light receiving device positioned, in alignment with the optical path, on the second mounting surface and being responsive to light of a second wavelength, the semiconductor light receiving device being optically coupled to the second surface of the optical filter through the optical path, thereby receiving the light of the second wavelength from the optical filter.

With the optical module thus constructed, the module size can be easily reduced since the semiconductor light emitting device, the optical filter, and the semiconductor light receiving device are all mounted to the mount.

The optical module of the present invention may have a feature such that the side face of the optical path is the inner surface of a through-hole extending from the second mounting surface and penetrating through the mount.

Also, the optical module of the present invention may have a feature such that the side surfaces of a groove extending from the second mounting surface define the sides of the optical path.

Further, the optical module of the present invention may have a feature that the semiconductor light receiving device includes a rear-illuminated photodiode.

With the optical module having that feature, since the rear-illuminated photodiode can be mounted with its incident surface positioned to face the mounting surface of the mount, it is easier to attach bonding wires to the photodiode.

The optical module of the present invention may be structured such that a bandpass optical filter for blocking off the light of the first wavelength is disposed between the second surface of the optical filter and the incident surface of the semiconductor light receiving device.

With the optical module having that feature, since another optical filter blocks off the light of the first wavelength directing toward the semiconductor light receiving device, the light emitted from the semiconductor light emitting device can be prevented from entering the semiconductor light receiving device.

The optical module of the present invention may have a feature that the semiconductor light receiving device has a filter portion blocking off the light of the first wavelength.

With the optical module having that feature, since the filter portion blocks off the light of the first wavelength having entered the semiconductor light receiving device, the light emitted from the semiconductor light emitting device can be prevented from being detected by the semiconductor light receiving device.

The optical module of the present invention may further be provided with a second semiconductor light receiving device for receiving a monitoring light emitted from the semiconductor light emitting device such that the semiconductor light emitting device is positioned between the optical filter and the second semiconductor light receiving device.

With that arrangement, average power of the light emitted from the semiconductor light emitting device can be detected by the second semiconductor light receiving device and can be stably controlled.

The optical module of the present invention may further comprise an amplifier for amplifying an electrical signal from the semiconductor light receiving device, the amplifier being mounted on the second mounting surface.

In the optical module having such feature, since the amplifier is mounted on the second mounting surface on which the semiconductor light receiving device is also mounted, those two components can be disposed close to each other and therefore the length of wire connection between the amplifier and the semiconductor light receiving device can be shortened.

The optical module of the present invention may further comprise an insulating substrate on which the semiconductor light receiving device and the amplifier are provided and which has a light passing portion in alignment with the optical path at the second mounting surface, wherein the insulating substrate is mounted on the second mounting surface.

The optical module having such structure can be assembled easily because it is possible to first attach the semiconductor light receiving device and the amplifier to the insulating substrate and then mount the insulating substrate on the second mounting surface. Also, since the semiconductor light receiving device and the amplifier are mounted to the mount with the insulating substrate interposed therebetween, the semiconductor light receiving device can be effectively electrically isolated from the mount by the insulating substrate.

The optical module of the present invention may further comprise a lens holder for holding a lens optically coupled to the optical filter, wherein the lens holder is mounted on the stem in such a manner as to cover the mount. This feature enables an optical system to be simply constructed.

The optical module of the present invention may further comprise an optical fiber optically coupled to the lens, a ferrule for holding the optical fiber, a first sleeve for holding the ferrule, and a second sleeve for holding the first sleeve. This feature simplifies optical coupling of the optical module to the exterior.

In addition, the present invention provides a method of manufacturing an optical module, comprising the steps of (a) mounting a first semiconductor light receiving device and an amplifier on an insulating substrate, thereby forming an optical receiver unit, (b) inspecting the optical receiver unit, (c) mounting a semiconductor light emitting device on a first mounting surface of a mount on a stem and a second semiconductor light receiving device on the stem, thereby forming an optical transmitter unit, (d) inspecting the optical transmitter unit, (e) mounting the optical receiver unit on a second mounting surface of the mount on the stem, and (f) attaching an optical filter to the mount so as to be optically coupled to the semiconductor light emitting device and the first semiconductor light receiving device.

With the manufacturing method described above, the optical transmitter unit and the optical receiver unit are separately manufactured and individually inspected. Thus, the optical module can be assembled by employing only good ones of the respective units, and therefore the yield of manufactured optical modules can be increased.

BRIEF DESCRIPTION OF THE DRAWINGS

FIG. 7(a) is an explanatory view for explaining an optical path of a light in the optical module according to the first embodiment;

FIG. 7(b) is an explanatory view for explaining an optical path of a light in the optical module according to the first embodiment;

DESCRIPTION OF THE PREFERRED EMBODIMENTS

Embodiments of the present invention will be described below. Note that the same elements are denoted by the same marks and duplication of description is eliminated.

(First Embodiment)

Figure 1:
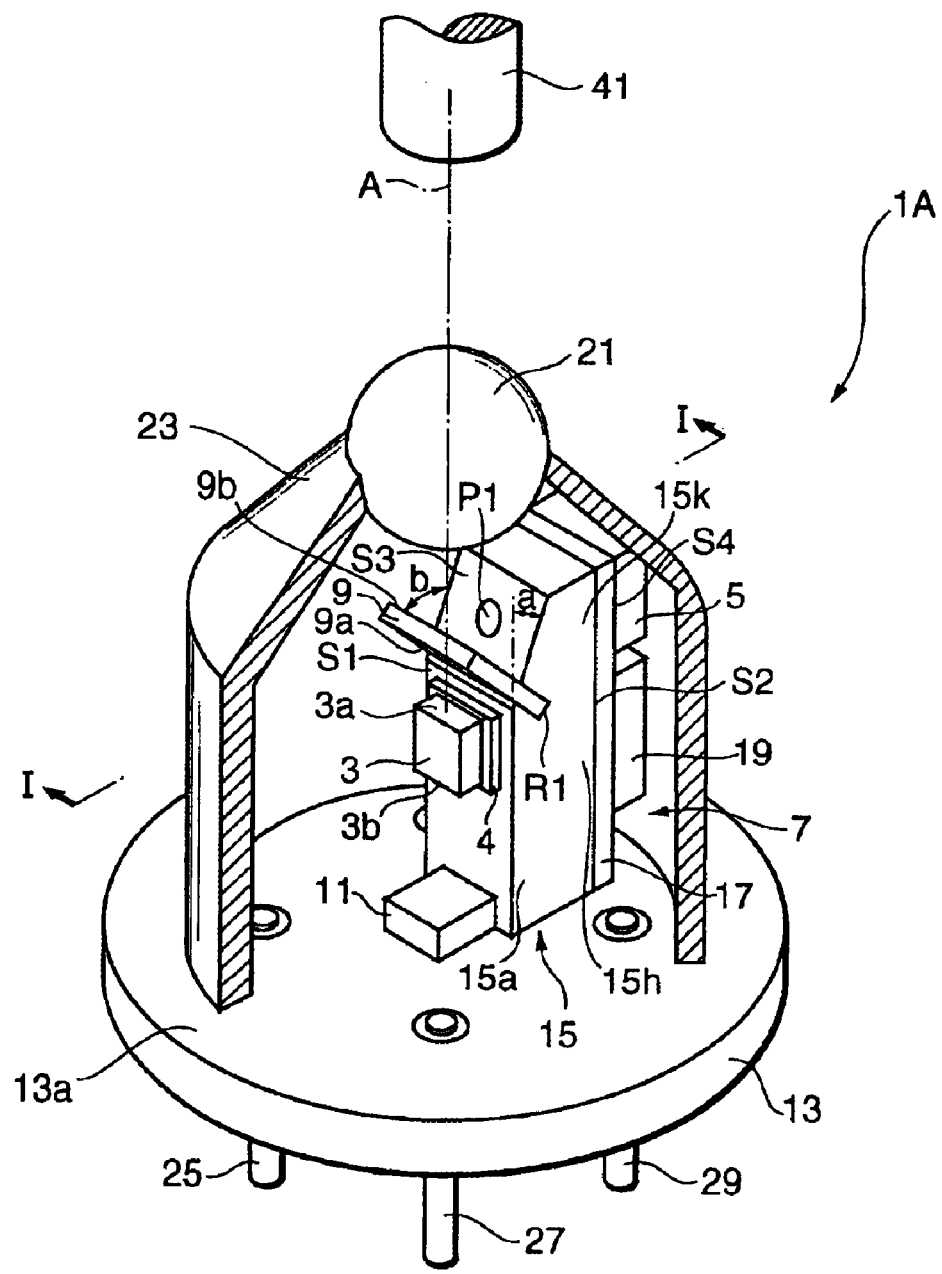
FIG. 1 is a perspective view of an optical module according to a first embodiment of the present invention.
Figure 2:
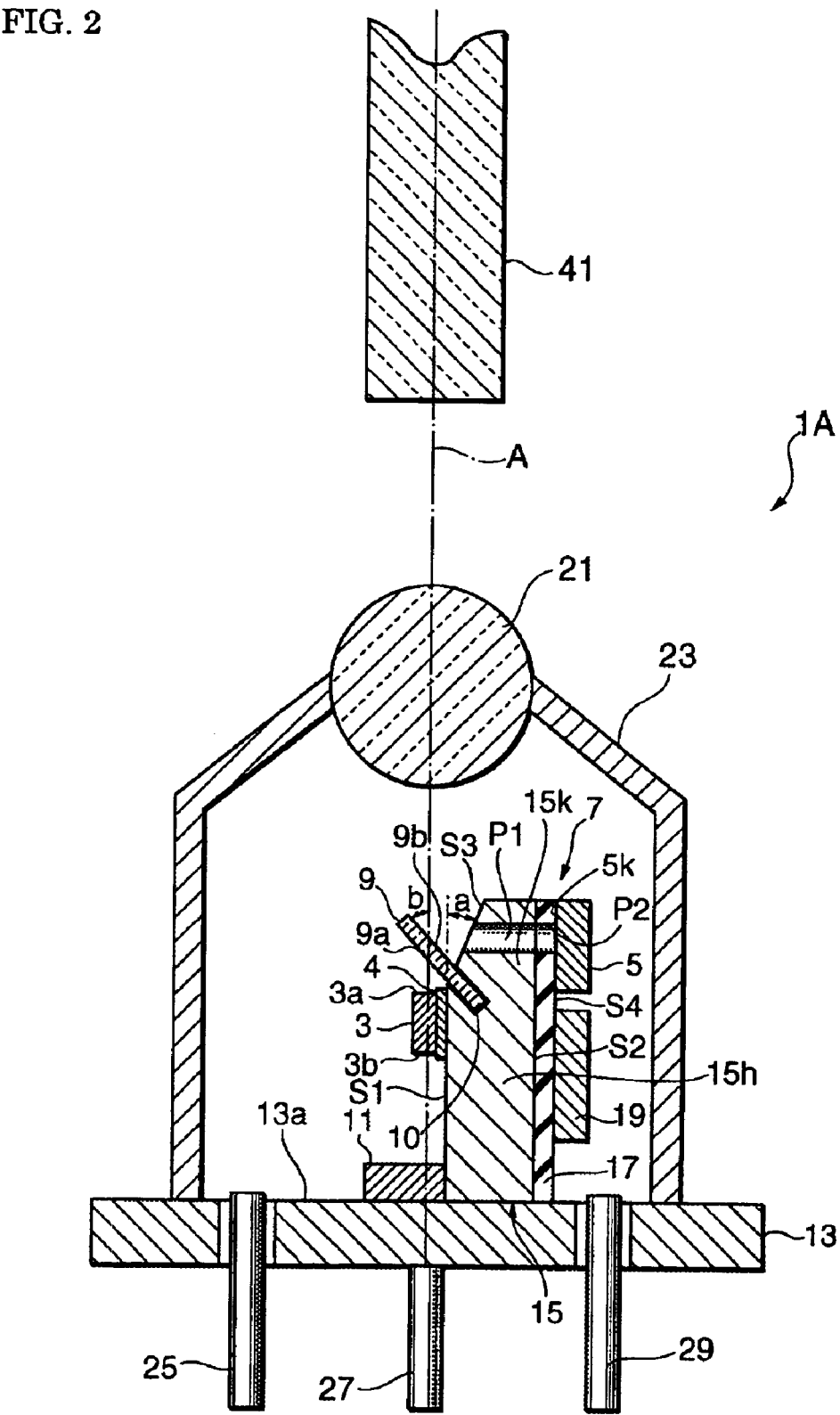
FIG. 2 is a side sectional view, taken along the line I—I in FIG. 1, of the optical module according to the first embodiment.
Figure 3:
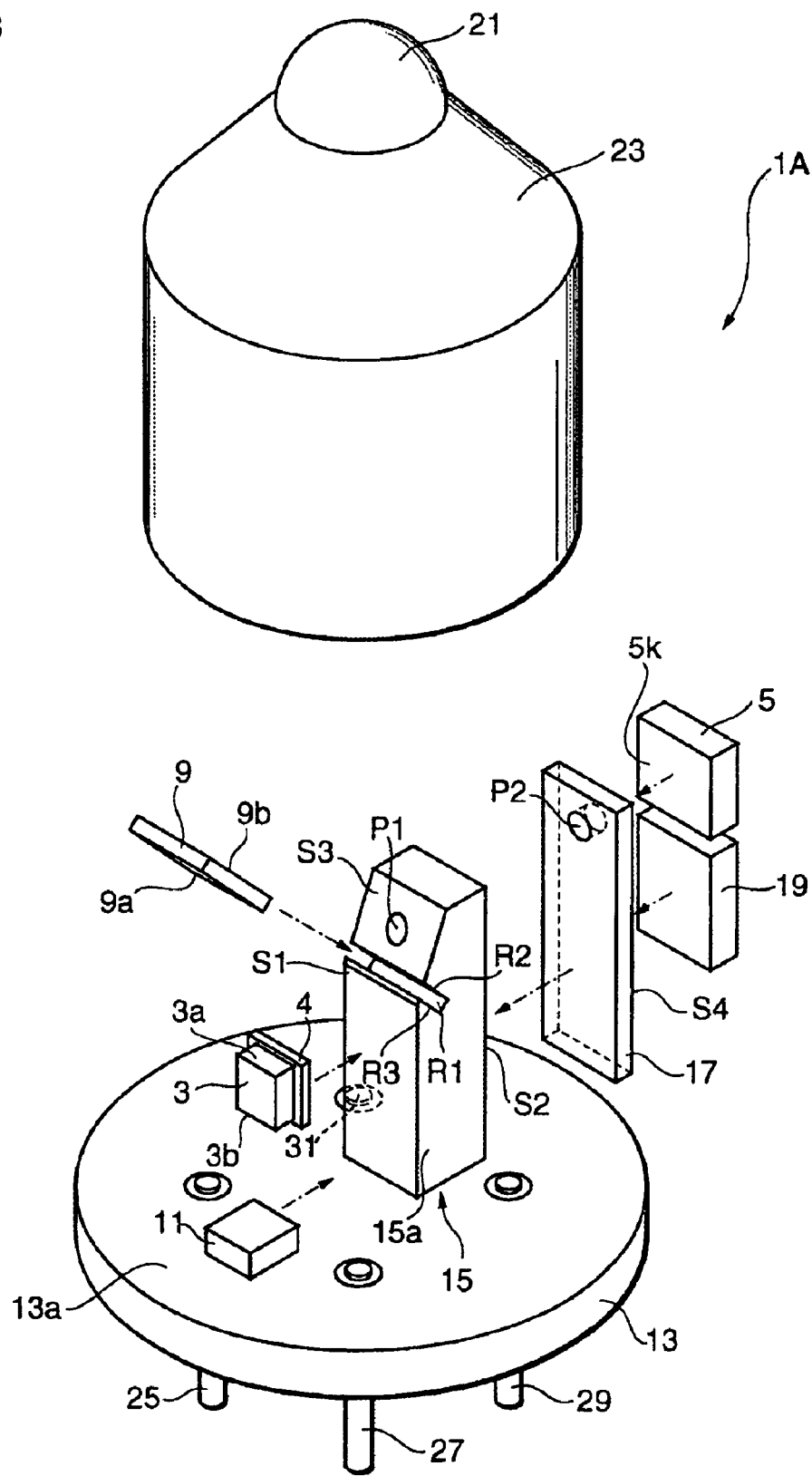
FIG. 3 is an exploded perspective view showing components of the optical module according to the first embodiment of the present invention.

FIG. 1 is a perspective view of an optical module according to a first embodiment of the present invention. FIG. 2 shows a section of the optical module taken along the line I—I in FIG. 1, and FIG. 3 shows components of the optical module.

An optical module 1A of this embodiment can be used in, e.g., an optical communication system made of optical fiber transmission lines, etc. The optical module 1A transmits light of a first wavelength and receives light of a second wavelength. The optical module 1A has a semiconductor light emitting device 3, a semiconductor light receiving device 5, an optical filter 9, a second semiconductor light receiving device 11, and a stem 13. The stem 13 includes a mount 15 having respective mounting surfaces onto which the semiconductor light emitting device 3, the semiconductor light receiving device 5 and the optical filter 9 are mounted. The semiconductor light emitting device 3 is, e.g., an InGaAsP-based semiconductor laser. The semiconductor light receiving device 5 is, e.g., an InGaAs-based photodiode. The optical filter 9 is, e.g., a wavelength division multiplex filter. The semiconductor light receiving device 11 is, e.g., a photodiode. The mount 15 is in the form of, for example, a pole. The first wavelength is one wavelength, for example, in a 1.3-micrometer band, and the second wavelength is one wavelength, for example, in a 1.55-micrometer band.

The stem 13 is formed of a member having a disk-like shape and has a principal surface 13a substantially perpendicularly crossing a predetermined axis A. The stem 13 includes the mount 15 standing substantially vertically to the principal surface 13a. The mount 15 functions as a mounting unit to which the semiconductor light emitting device 3, etc. are mounted. The mount 15 and the stem 13 are made of, e.g., metal materials.

Figure 4:
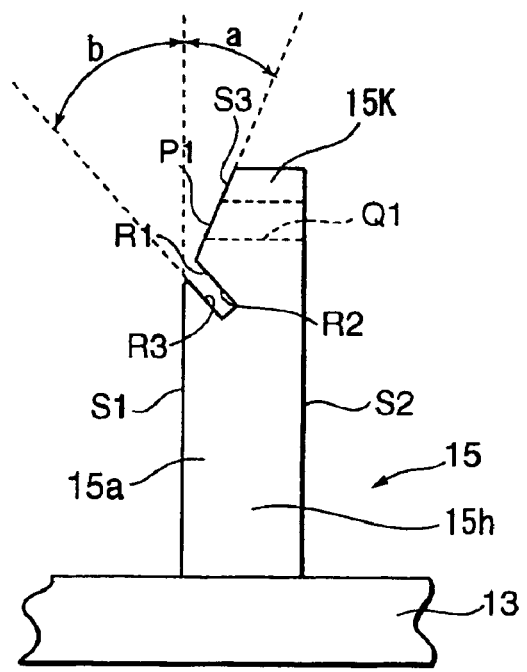
FIG. 4(a) is a side view of a mount.
FIG. 4(b) is a plan view of the mount.
FIG. 4(c) is a front view of the mount.
Figure 4:
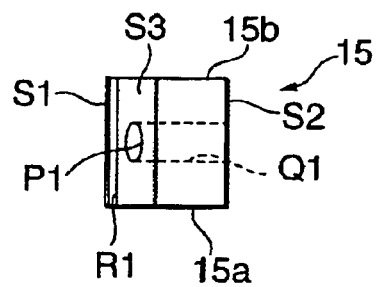
Figure 4:
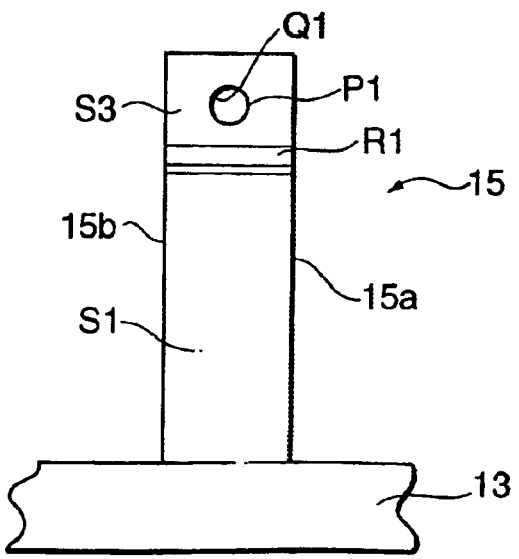

The mount 15 will be described in more detail with reference to FIGS. 4(a), 4(b) and 4(c). FIG. 4(a) is a side view of the mount 15, FIG. 4(b) is a plan view of the mount 15, and FIG. 4(c) is a front view of the mount 15. The mount 15 has a first mounting surface S1, a second mounting surface S2, and a third mounting surface S3. The first mounting surface S1 is extended in the direction of the predetermined axis A. The second mounting surface S2 is a surface in opposed relation to the first mounting surface S1 and the third mounting surface S3, and it is also extended in the direction of the predetermined axis A. The third mounting surface S3 extends at an angle a relative to the first mounting surface S1. The mount 15 has a first portion 15h and a second portion 15k, which are successively arranged in the direction of the predetermined axis A. The first portion 15h has the first mounting surface S1, and the second portion 15k has the third mounting surface S3.

Further, the mount 15 is provided with a through-hole P1 and a slit R1. The through-hole P1 is defined by an inner cylindrical surface Q1 extending in the direction toward the second mounting surface S2 from the third mounting surface S3. The through-hole P1 penetrates the mount 15 from the third mounting surface S3 to the second mounting surface S2. The slit R1 is formed at a portion between the first mounting surface S1 and the through-hole P1 in the third mounting surface S3. The slit R1 has a width spanning from one side surface 15a to an opposite surface 15b of the mount 15. The slit R1 extends from the third mounting surface S3 in a direction toward its depth at an angle b relative to the predetermined axis A. The slit R1 has a pair of support surfaces R2, R3 for supporting the optical filter 9, and the support surfaces R2, R3 respectively extend also at the angle b relative to the predetermined axis. The distance between the support surfaces R2 and R3 is set in relation to the thickness of the optical filter 9, and preferably is substantially equal to the thickness of the optical filter 9. Thus, when the optical filter 9 is inserted in the slit R1, it is oriented to extend at the angle b relative to the predetermined axis A, and accordingly, the optical filter 9 is disposed so as to cross an optical axis of the semiconductor light emitting device 3.

Referring to FIGS. 1 to 3 again, the semiconductor light emitting device 3 will be described below. The semiconductor light emitting device 3 is a semiconductor device for emitting light that is outputted as an optical signal from the optical module 1A, and it converts an electrical signal into an optical signal. The semiconductor light emitting device 3 is mounted on the first mounting surface S1 and is disposed between the optical filter 9 and the principal surface 13a of the stem 13. The semiconductor light emitting device 3 mounted on the first mounting surface S1 has a pair of end faces 3a and 3b. The light of the first wavelength is emitted from one end face 3a. The semiconductor light emitting device 3 is mounted to the first mounting surface S1, by way of example, with a mount member 4, e.g., a submount, interposed between them.

The optical filter 9 is mounted on the third mounting surface S3. The optical filter 9 is disposed in a position where it is optically coupled to the semiconductor light emitting device 3. Also, the optical filter 9 is disposed in a position where it is optically coupled to the semiconductor light receiving device 5 via the through-hole P1. The optical filter 9 is oriented to cross the predetermined axis A at the angle b. The optical filter 9 is positioned by being inserted in the slit R1 formed in the third mounting surface S3. The optical filter 9 is fixed to the mount 15 by using, e.g., an adhesive 10. The optical filter 9 has filter characteristics allowing the light of the first wavelength to pass through it, but reflecting the light of the second wavelength.

An optical receiver unit 7 will be described below with reference to FIGS. 5(a) and 5(b). FIG. 5(a) is a perspective view of the optical receiver unit 7, and FIG. 5(b) is a side view of the optical receiver unit 7. The optical receiver unit 7 is mounted on the second mounting surface S2. The optical receiver unit 7 has an insulating substrate 17, the semiconductor light receiving device 5, and an amplifier 19.

The insulating substrate 17 is mounted on the second mounting surface S2. The insulating substrate 17 is located between the semiconductor light receiving device 5 and the amplifier 19 on one side and the mount 15 on the other side. The insulating substrate 17 is made of an insulating material (e.g., alumina ($Al_2O_3$), silicon oxide ($SiO_2$), or aluminum nitride (AlN)). The insulating substrate 17 has an opening P2 aligned with the through-hole P1 in the mount 15. Also, the insulating substrate 17 has a component mounting surface S4 and a surface S5 on the side opposite to the component mounting surface S4. The semiconductor light receiving device 5 and the amplifier 19 are mounted on the component mounting surface S4. The opposite side surface S5 is positioned to face the second mounting surface S2.

Referring to FIGS. 1 to 3 again, the semiconductor light receiving device 5 will be described below. The semiconductor light receiving device 5 receives the light of the second wavelength incident upon its rear surface and converts the incident light into an electrical signal. The semiconductor light receiving device 5 is mounted on the component mounting surface S4. More specifically, the semiconductor light receiving device 5 is mounted on the component mounting surface S4 such that an incident surface 5k upon which the light impinges is positioned to face the component mounting surface S4. The semiconductor light receiving device 5 is mounted to the second mounting surface S2 of the mount 15 with the insulating substrate 17 interposed between them. The incident surface 5k of the semiconductor light receiving device 5 is aligned with the position of the opening P2.

Figure 6:
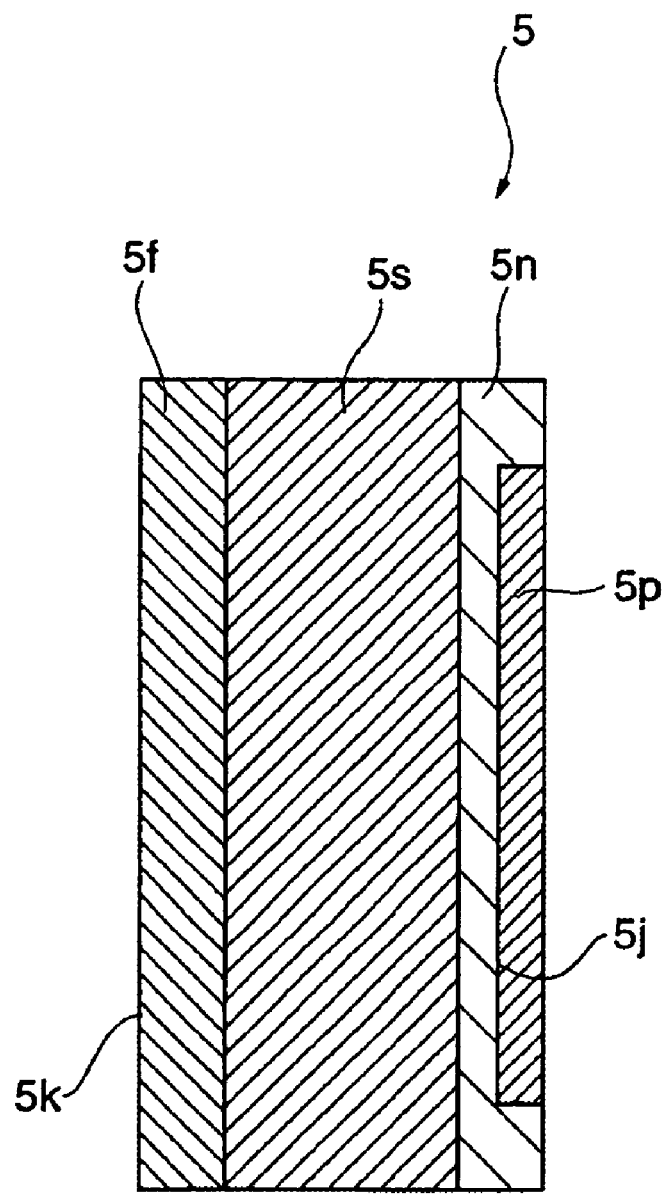
FIG. 6 is a sectional view of a semiconductor light receiving device.

The semiconductor light receiving device 5 will be described in more detail below with reference to FIG. 6. FIG. 6 is a sectional view of the semiconductor light receiving device 5. In this embodiment, a rear-illuminated photodiode is used as the semiconductor light receiving device 5. The semiconductor light receiving device 5 has a filter portion 5f located between the incident surface 5k and a pn-junction 5j, and also has a light receiving layer 5n and a Zn-diffused area 5p. The filter portion 5f is formed on one surface of a substrate (e.g., n-InP) 5S, has characteristics of being able to block off the light of the first wavelength (e.g., 1.3 μm), and is made of an epitaxial layer of InGaAsP (with band gap wavelength of, e.g., 1.42 μm). Even when light emitted from the semiconductor light emitting device 3 strays around the mount 15 to enter thereinto, the incoming stray light is blocked off by the filter portion 5f and is prevented from causing noise in the semiconductor light receiving device 5.

Referring to FIGS. 1 to 3 again, the amplifier 19 is mounted on the component mounting surface S4 of the insulating substrate 17. The amplifier 19 amplifies the electrical signal from the semiconductor light receiving device 5 and outputs the amplified signal. The amplifier 19 is disposed between the semiconductor light receiving device 5 and the stem 13, and it is mounted to the second mounting surface S2 of the mount 15 with the insulating substrate 17 interposed therebetween.

The second semiconductor light receiving device 11 is mounted on the principal surface 13a of the stem 13 and receives a part of a monitoring light emitted from the other end face 3b of the semiconductor light emitting device 3. The semiconductor light emitting device 3 is disposed between the optical filter 9 and the second semiconductor light receiving device 11. The second semiconductor light receiving device 11 receives the monitoring light emitted from the other end face 3b of the semiconductor light emitting device 3, thereby monitoring the operating state of the semiconductor light emitting device 3. Also, for example, by performing feedback control of a driving current supplied to the semiconductor light emitting device 3 using a monitoring current value from the second semiconductor light receiving device 11, it is possible to realize APC (Automatic Power Control) driving for holding constant the intensity of the light outputted from the semiconductor light emitting device 3.

The optical module 1A includes a lens 21. The lens 21 receives light from the semiconductor light emitting device 3 through the optical filter 9. The semiconductor light receiving device 5 receives light through the lens 21 and the optical filter 9. A spherical lens or an aspherical lens, for example, is employed as the lens 21. The lens 21 is held by a lens holder 23 fixed to the stem 13. The lens 21 is disposed between the semiconductor light emitting device 3 and an optical fiber 41. The light emitted from the semiconductor light emitting device 3 passes through the optical filter 9 and is then focused by the lens 21 so as to enter the optical fiber 41. On the other hand, light which is to be received by the semiconductor light receiving device 5 exits the optical fiber 41, is focused by the lens 21, and reflected by the optical filter 9 so as to be incident on the semiconductor light receiving device 5. As described above, the lens 21 serves to intensify optical coupling of the optical fiber 41 to both the semiconductor light emitting device 3 and the semiconductor light receiving device 5.

The lens 21 is held by the lens holder 23. The lens holder 23 is preferably made of a metallic material and is disposed on the principal surface 13a of the stem 13. The mount 15 is arranged in a space surrounded by the principal surface 13a of the stem 13 and the lens holder 23. Also, that space is filled with inert gas (e.g., nitrogen or argon). The lens holder 23 has an aperture formed in a position aligned with the predetermined axis A, and the lens 21 is fixed to the aperture.

Lead pins 25, 27, 29 and 31 (among them, 31 is in a hidden position on the drawings) penetrate through the stem 13 in the direction substantially vertical to the principal surface 13a. These lead pins are used for inputting and outputting electrical signals. Electric power is supplied from the exterior through the lead pins.

The operation of the optical module 1A of this embodiment will be described below with reference to FIGS. 7(a) and 7(b). Arrows in FIG. 7(a) represent propagation of transmitted light. In the optical module 1A, the semiconductor light emitting device 3 generates light L1 of a first wavelength. The light L1 becomes light L2 by passing through the optical filter 9. The light L2 is focused by the lens 21 to become light L3 which is to enter the optical fiber 41. The light L3 enters the optical fiber 41 and becomes light L4, which propagates through the optical fiber 41.

Arrows in FIG. 7(b) represent an optical path of light to be received by the semiconductor light receiving device 5. Light L5 having a second wavelength exits from one end 41a of the optical fiber 41 and enters the lens 21. The lens 21 receives the light L5 and provides focused light L6, which enters the optical filter 9. Apart of the light L6 is reflected by the optical filter 9 and becomes light L7, which passes the through-hole P1 and the opening P2 and then enters the semiconductor light receiving device 5. The incident light L7 is converted into an electrical signal by the semiconductor light receiving device 5.

Figure 17:
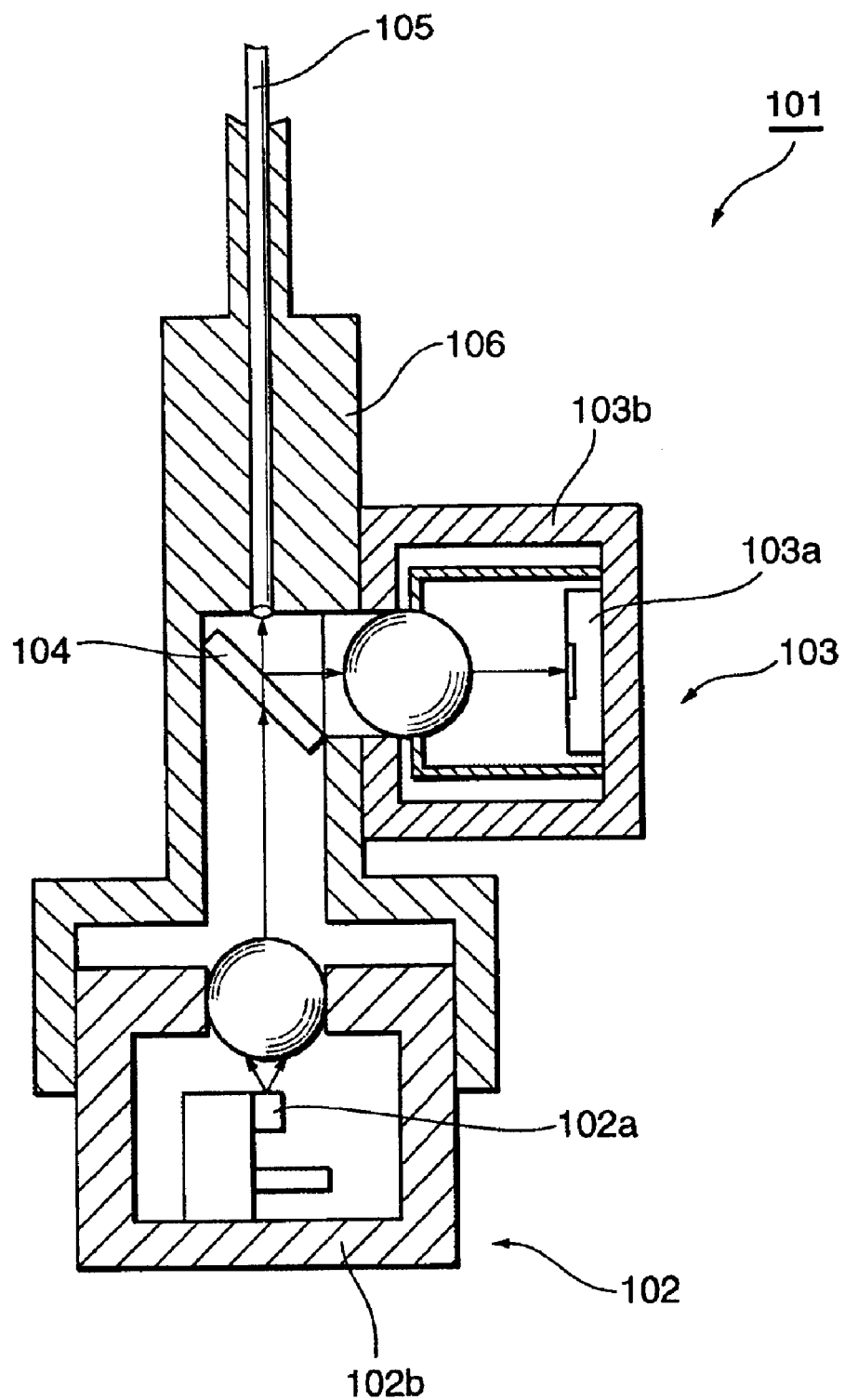
FIG. 17 is a sectional view of a known optical module.

In the optical module 1A thus constructed, the semiconductor light emitting device 3, the optical filter 9, and the semiconductor light receiving device 5 are mounted to the same mount 15. The lens holder 23 and the principal surface 13a of the stem 13 constitute a housing. The mount 15 is arranged in the space surrounded by the lens holder 23 and the principal surface 13a of the stem 13. In the optical module 1A, therefore, the semiconductor light emitting device 3, the semiconductor light receiving device 5, and the optical filter 9 are housed in one housing, thus enabling the module size to be reduced. Further, since the number of housings and the number of parts are smaller than those in the optical module shown in FIG. 17, it is possible to simplify the assembly steps and to reduce the cost.

The mount 15 has the through-hole P1. Therefore, the first mounting surface S1 for mounting the semiconductor light emitting device 3 thereon and the third mounting surface S3 for mounting the optical filter 9 thereon can be arranged on one side of the mount 15, opposite to the other side on which the second mounting surface S2 for mounting the semiconductor light receiving device 5 thereon is located. Hence, the optical module 1A can realize effective use of the mounting surfaces of the mount 15. Further, because the mount 15 is positioned between the semiconductor light emitting device 3 and the semiconductor light receiving device 5, the light emitted from the semiconductor light emitting device 3 is suppressed from entering the semiconductor light receiving device 5 as stray light.

The semiconductor light receiving device 5 of the optical module 1A includes the filter portion 5f having characteristics of being able to block off the light of the first wavelength. Accordingly, even when the light of the first wavelength emitted from the semiconductor light emitting device 3 enters the semiconductor light receiving device 5, that light is blocked off by the filter portion 5f. As a result, the optical module 1A is capable of reducing crosstalk between input light and output light.

According to the optical module 1A, when the mount 15 is made of a metal, the mount 15 serves as a ground and therefore satisfactory electrical isolation can be obtained between the various semiconductor devices.

Also, in the above described optical module 1A, the insulating substrate 17 of an insulating material is interposed between the second mounting surface S2 and the semiconductor light receiving device 5 and the amplifier 19 which are mounted thereto. This arrangement enables the optical receiver unit 7 to be bonded to the mount 15, and hence simplifies the assembly process. In addition, the presence of the insulating substrate 17 contributes to electrically insulating the semiconductor light receiving device 5 and the amplifier 19 from the mount 15 serving as a ground. Moreover, since the semiconductor light receiving device 5 and the amplifier 19 are arranged on the same insulating substrate 17, the length of wire connection between these components can be shortened and accordingly noise can be reduced.

In the optical module 1A, the third mounting surface S3 is inclined relative to the first mounting surface S1 on which the semiconductor light emitting device 3 is mounted. Such an inclination prevents emitted light from being partly blocked off from transmission by the first mounting surface S1. Further, according to the above described embodiment of the optical module 1A, the mount 15 has the slit R1 which is positioned specifically relative to the first mounting surface S1 and the second mounting surface S2 such that the optical filter 9 is inserted in the slit R1. The slit R1 extends along a reference plane which forms predetermined angles relative to the first mounting surface S1 and the third mounting surface S3, respectively. Thus, when the optical filter 9 is fixed in place with an adhesive, the laser beam emitted from the semiconductor light emitting device 3 can be avoided from being partly blocked off by the adhesive.

Figure 8:
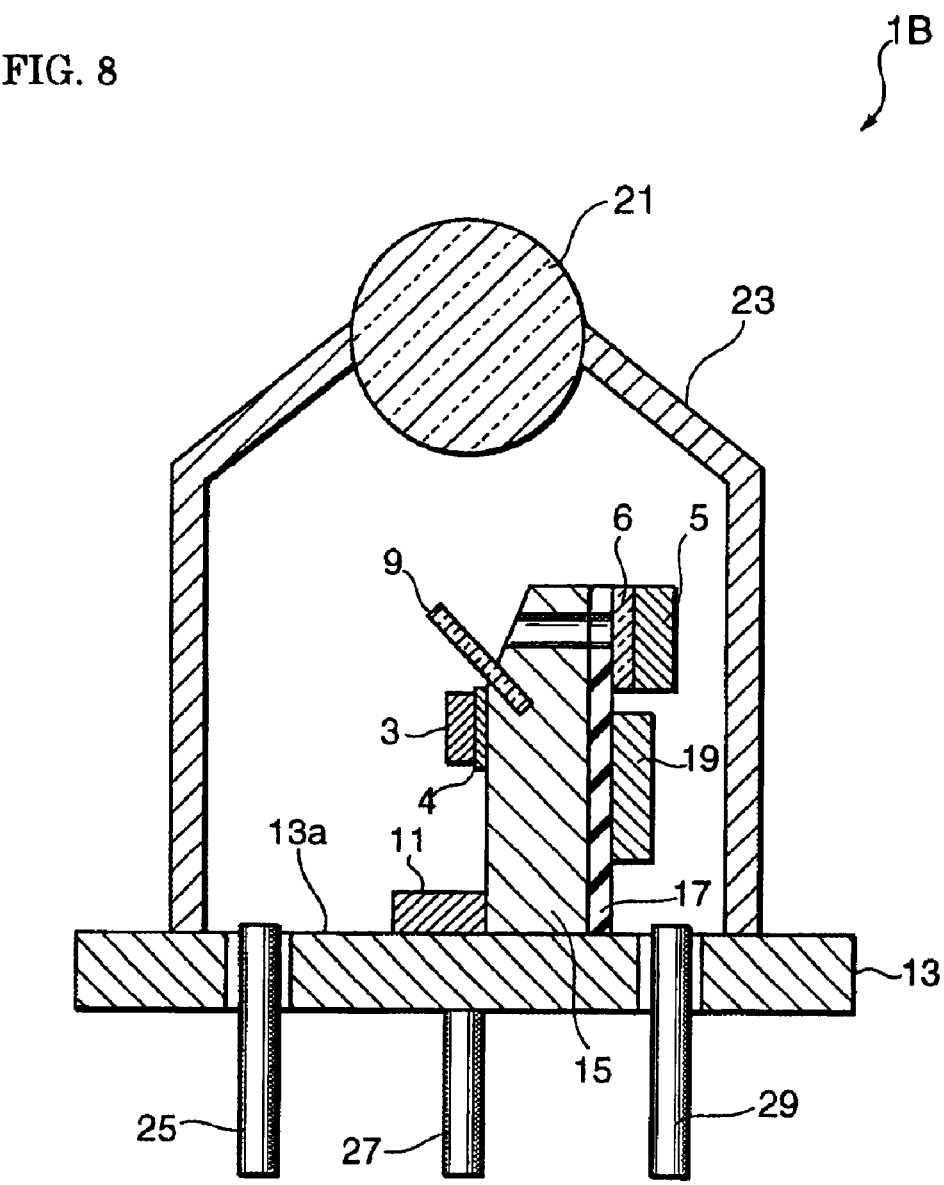
FIG. 8 is a sectional view for explaining a modification of the first embodiment.

FIG. 8 shows an optical module 1B as a modification of the optical module 1A. The optical module 1B includes a bandpass optical filter 6 having a property of intercepting the light of the first wavelength. The optical module 1A includes, as the semiconductor light receiving device 5, a semiconductor light receiving device having the filter portion 5f. On the other hand, the optical module 1B may be structured such that, instead of the filter portion 5f, the bandpass optical filter 6 capable of intercepting the light of the first wavelength is provided between the optical filter (wavelength division multiplex filter) 9 and the semiconductor light receiving device 5. The bandpass optical filter 6 is provided on the incident surface of the semiconductor light receiving device 5, and at a position between the optical filter 9 and the semiconductor light receiving device 5. The bandpass optical filter 6 may be, e.g., a sheet-like filter made by forming a dielectric multilayer on a polyimide substrate.

Figure 9:
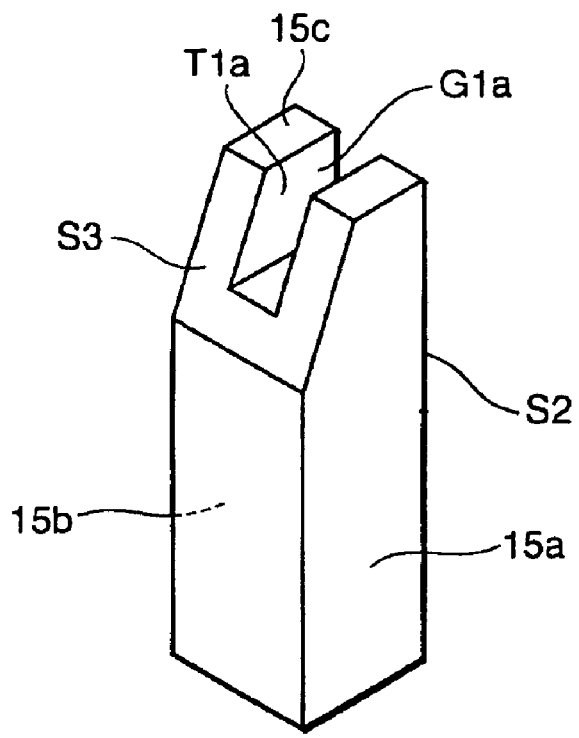
FIGS. 9(a) and 9(b) are each a perspective view of the mount.
Figure 9:
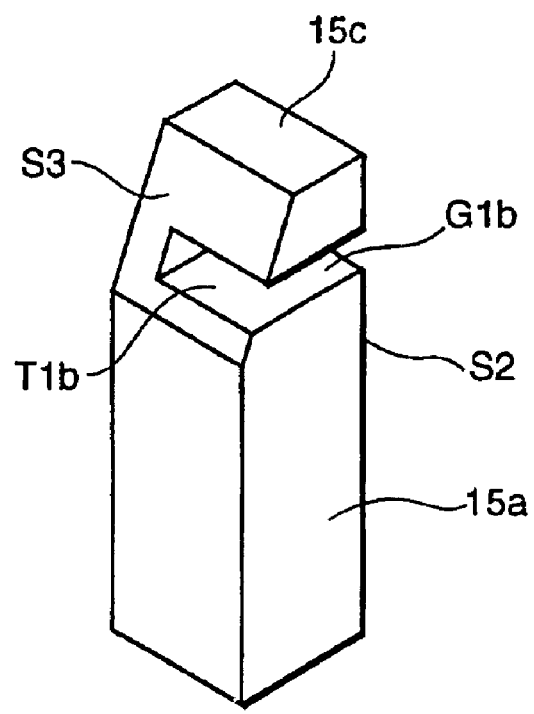

In the optical module 1A, the through-hole P1 in the mount 15 is employed as an optical path for the light reflected by the optical filter 9. However, the optical path formed in the mount 15 may be structured as a groove G1a or G1b shown in perspective views of FIGS. 9(a) and 9(b). The groove G1a is formed in an end surface 15c of the mount 15 and is extended from the third mounting surface S3 to the second mounting surface S2. The groove G1b is formed in a side surface 15a of the mount 15 and is extended from the third mounting surface S3 to the second mounting surface S2. Accordingly, the light advancing from the optical filter 9 toward the semiconductor light receiving device 5 can pass through the groove G1a or G1b depending on the structure.

Figure 5:
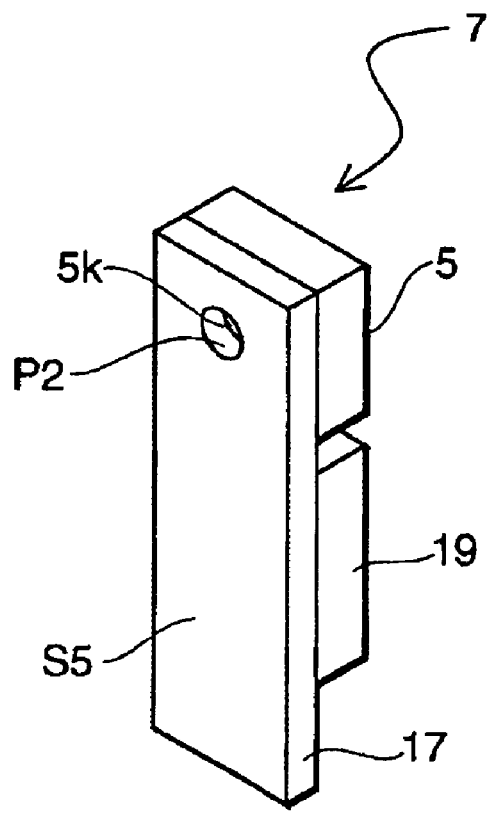
FIG. 5(a) is a perspective view of an optical receiver unit.
FIG. 5(b) is a side view of the optical receiver unit.
Figure 5:
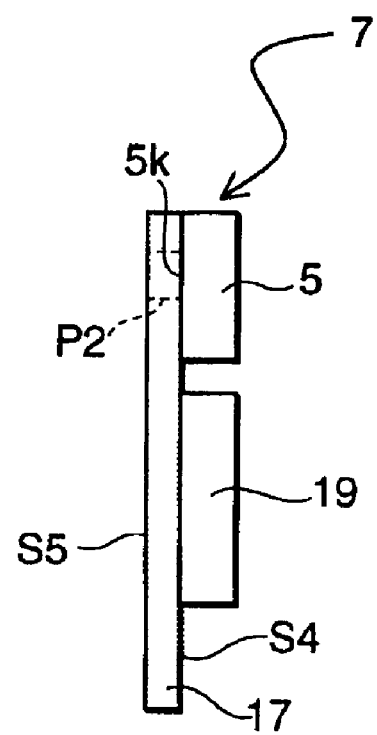
Figure 10:
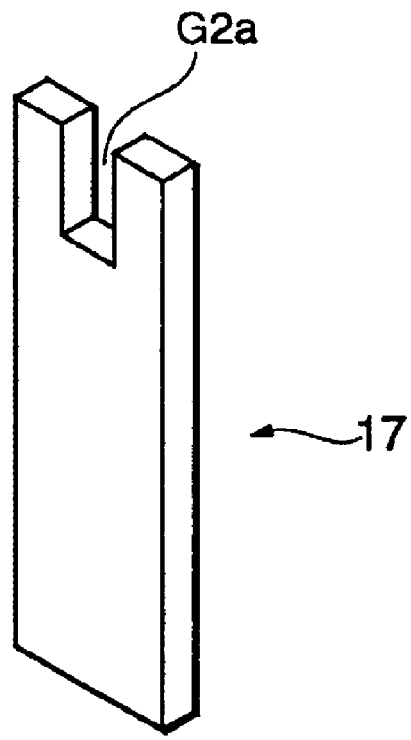
FIGS. 10(a) and 10(b) are each a perspective view of an insulating substrate.
Figure 10:
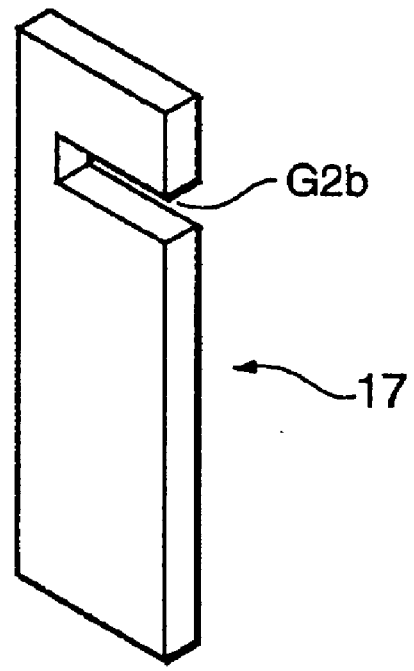

Also, in the optical module 1A, the insulating substrate 17 has the opening P2 shown in FIG. 5. However, the opening P2 may be formed in the insulating substrate 17 as a notch-like opening G2a or G2b, for example, as shown in FIGS. 10(a) and 10(b). Any type of the mount 15 shown in FIGS. 4, 9(a) and 9(b) can be combined, as required, with any type of the insulating substrate 17 shown in FIGS. 5, 10(a) and 10(b).

Figure 11:
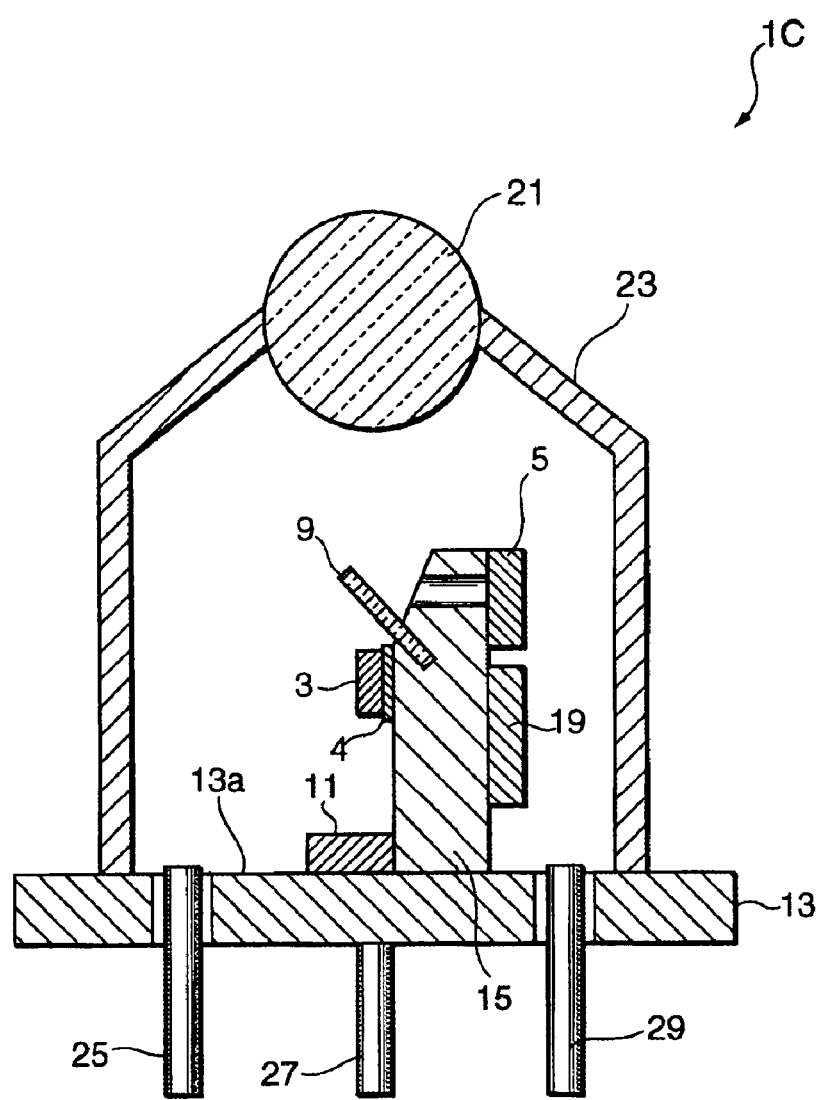
FIG. 11 is a sectional view for explaining another modification of the first embodiment.

Further, in the optical module 1A, the semiconductor light receiving device 5 and the amplifier 19 are mounted to the second mounting surface S2 of the mount 15 with the insulating substrate 17 interposed therebetween. As an alternative, the semiconductor light receiving device 5 and the amplifier 19 may be mounted on the mount 15 without interposing the insulating substrate 17. FIG. 11 shows an optical module 1C representing such an alternative. In the optical module 1C, the semiconductor light receiving device 5 and the amplifier 19 are directly mounted on the second mounting surface S2.

(Second Embodiment)

Figure 12:
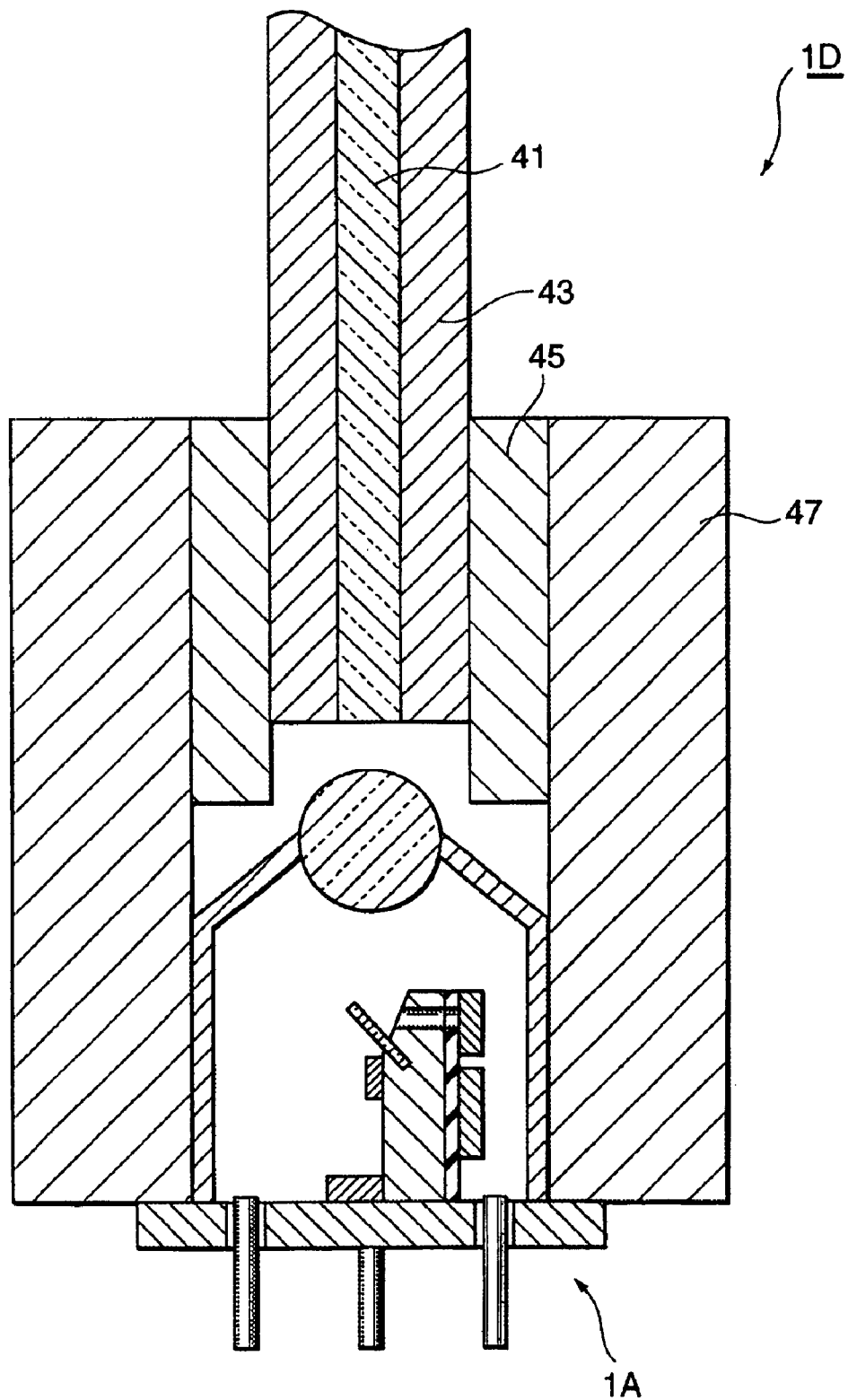
FIG. 12 is a sectional view of an optical module according to a second embodiment.
Figure 13:
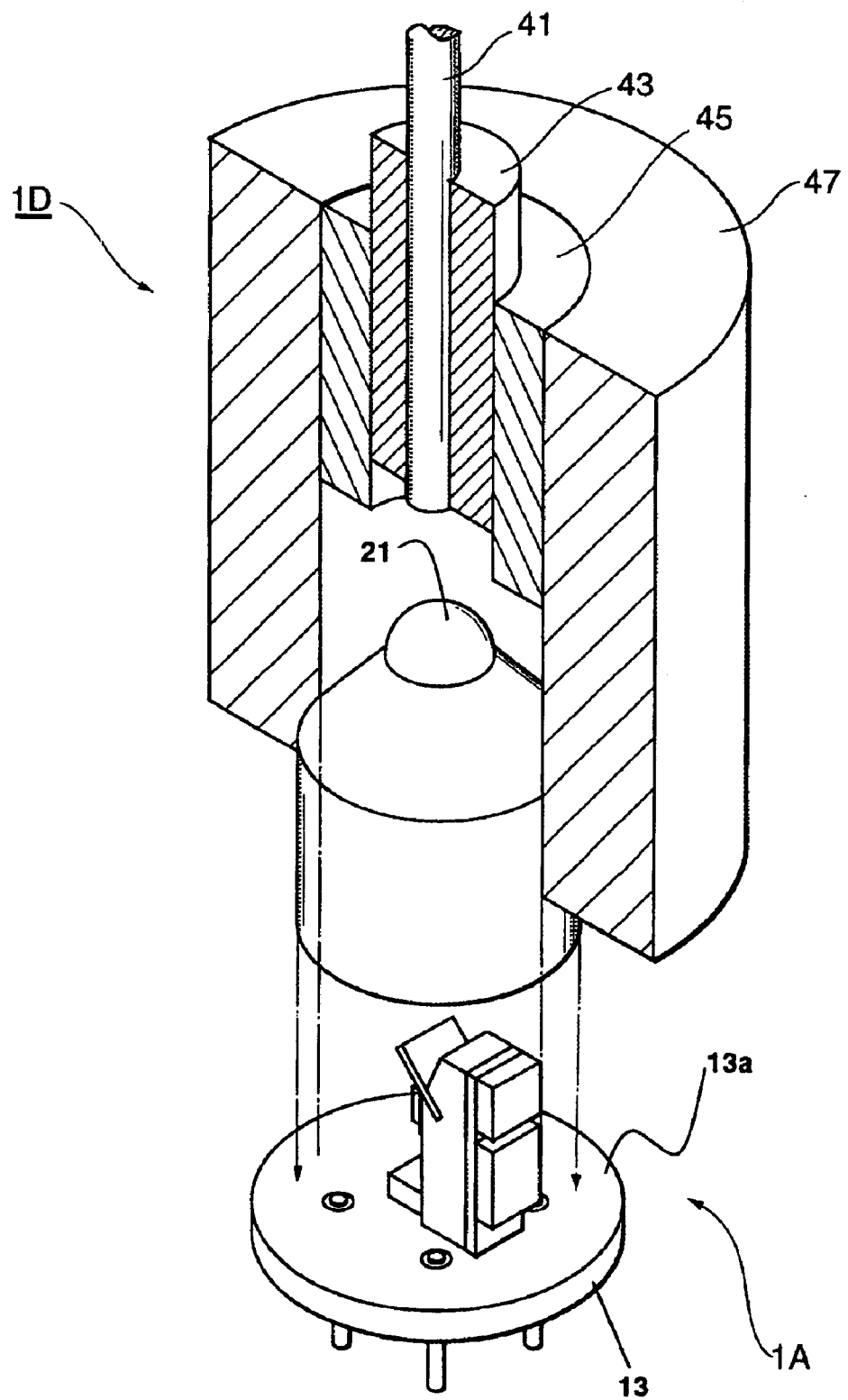
FIG. 13 is an exploded perspective view of the optical module according to the second embodiment.
Figure 14:
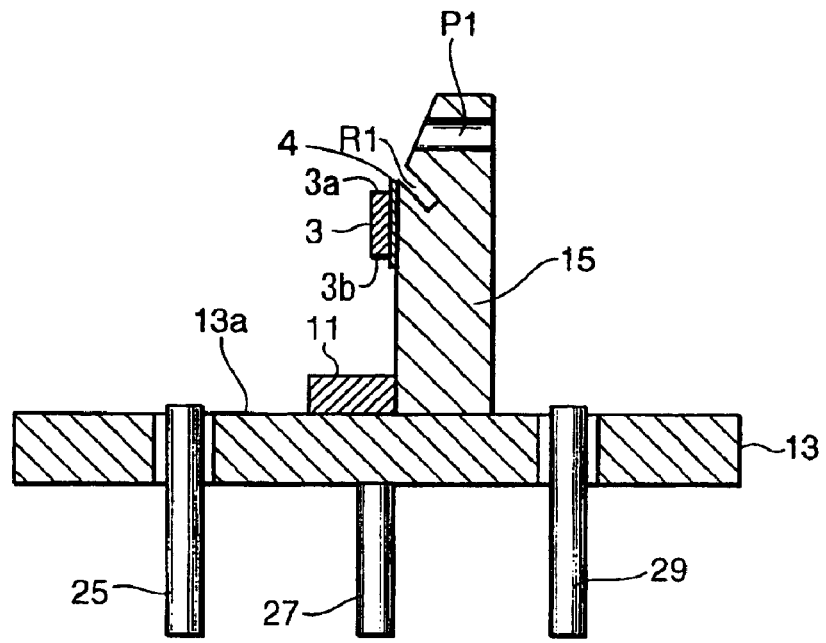
FIGS. 14(a) and 14(b) are each an explanatory view for explaining a manufacturing process of the optical module according to the first embodiment.
Figure 14:
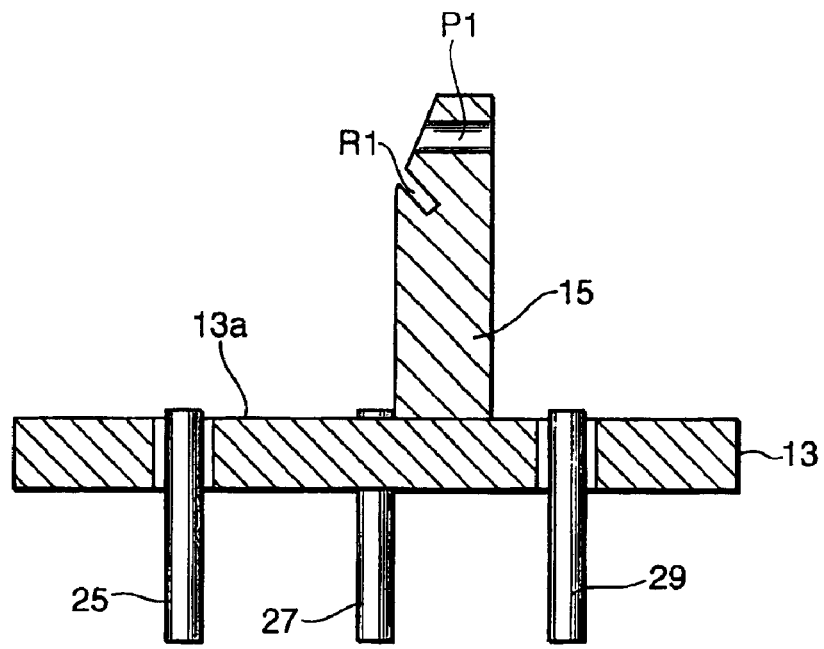

FIG. 12 is a sectional view of an optical module 1D according to a second embodiment of the present invention. FIG. 13 is an exploded partly cutaway perspective view of the optical module 1D shown in FIG. 12.

The second embodiment further comprises the optical fiber 41, a ferrule 43, a first sleeve 45, and a second sleeve 47, that is, an optical coupling portion including these components is added to the optical module 1A.

The ferrule 43 holds the optical fiber 41. The first sleeve 45 holds the ferrule 43. The first sleeve 45 is made of, e.g., zirconia or a metal. The second sleeve 47, which holds the lens holder 23 and the first sleeve 45, is mounted on the stem 13. The second sleeve 47 is made of a metal such as stainless steel. The first sleeve 45 holds the ferrule 43 and is fixed in place after being slid along the inner wall of the second sleeve 47 in the direction of the predetermined axis A for alignment of the optical fiber 41. This arrangement enables the optical fiber 41 to be easily positioned in match with the focal length of the lens 21. The second sleeve 47 is movable on the principal surface 13a of the stem 13. The second sleeve 47 can be fixed in place after alignment of the waveguide of the optical fiber 41. Thus, it is easy to position the optical fiber 41 in the direction perpendicular to the predetermined axis A.

Manufacturing Process of Optical Module According to First Embodiment)

The manufacturing process of the optical module 1A according to the first embodiment will be described below with reference to FIGS. 14(a), 14(b), 15, 16(a) and 16(b).

First, the stem 13 is prepared. The stem 13 has the mount 15, and the mount 15 is provided with the through-hole P1 and the slit R1 (see FIG. 14(a)). The semiconductor light emitting device 3 is then mounted to the first mounting surface S1 with a mount member 4 interposed between them. The second semiconductor light receiving device 11 is mounted in a position where it is able to receive the monitoring light emitted from the end face 3b of the semiconductor light emitting device 3. Further, the lead pins 25, 27 and 29, etc. are connected by Au wires (not shown) to the semiconductor light emitting device 3 and the second semiconductor light receiving device 11. With those steps, an optical transmitter unit is assembled. The optical transmitter unit including the stem 13, the semiconductor light emitting device 3, and the second semiconductor light receiving device 11 is subjected to inspection. In the inspection, a driving current (e.g., 0 to 100 mA) is applied to the semiconductor light emitting device 3 through the lead pins. The power of light emitted from the end face 3a is measured. Also, the monitoring current from the second semiconductor light receiving device 11 is measured. An optical module showing the power of the emitted light and the monitoring current which are not less than predetermined values is regarded as acceptable.

Figure 15:
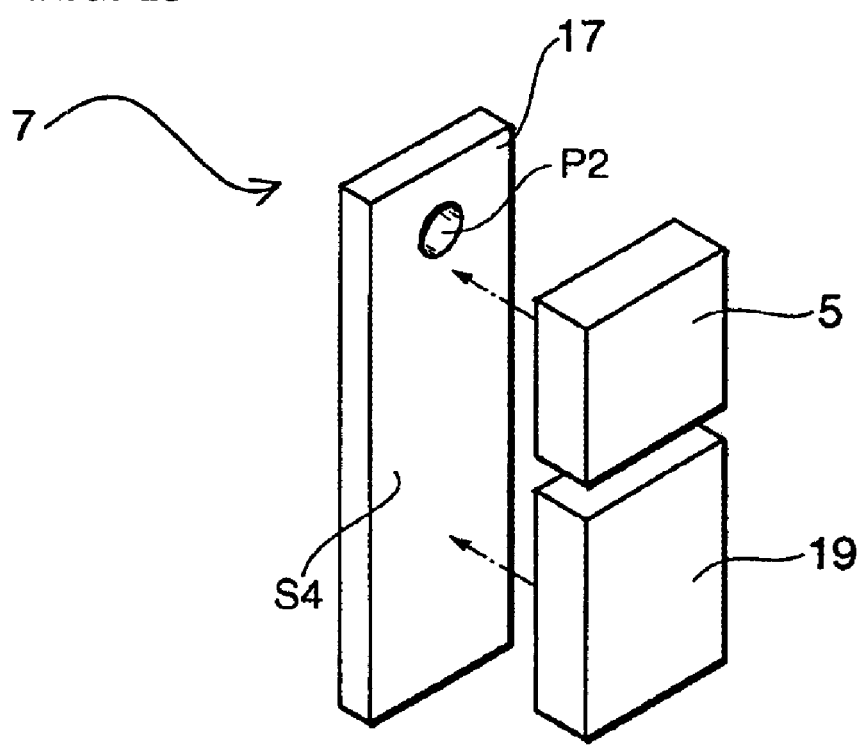
FIG. 15 is an explanatory view for explaining the manufacturing process of the optical module according to the first embodiment.

Next, the optical receiving unit 7 is manufactured (see FIG. 15). The insulating substrate 17 is first prepared. The semiconductor light receiving device 5 is fixed onto the component mounting surface S4 while the incident surface of the semiconductor light receiving device 5 is aligned with the position of the opening P1 in the mount 15. Then, the amplifier 19 is fixed onto the component mounting surface S4, and the amplifier 19 and the semiconductor light receiving device 5 are connected to a conductive pattern on the insulating substrate 17 by respective bonding wires. The optical receiver unit 7 thus manufactured is subjected to inspection. In the inspection, light is introduced to enter the semiconductor light receiving device 5 through the opening P2, and thereby the respective electrical outputs of the semiconductor light receiving device 5 and the amplifier 19 are measured with a probing method. An optical module showing the electrical outputs each not smaller than a preset value is regarded as acceptable.

Figure 16:
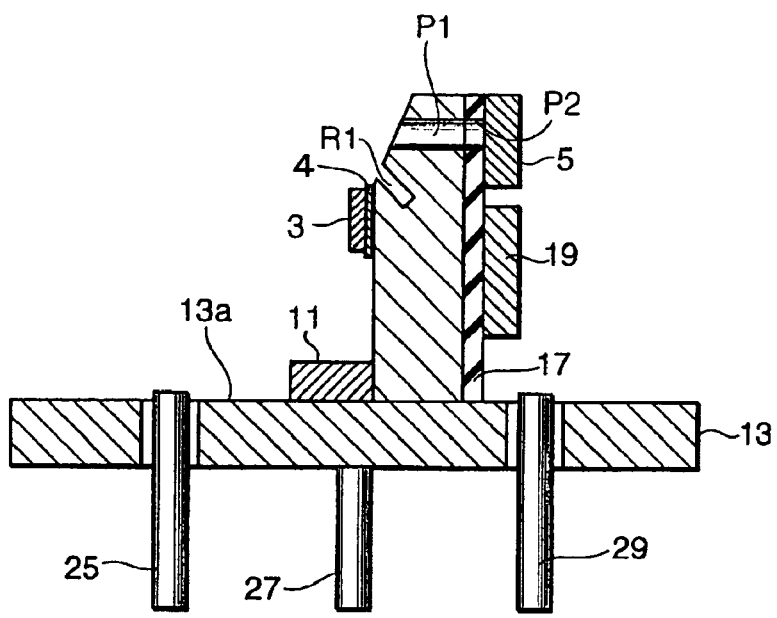
FIGS. 16(a) and 16(b) are each an explanatory view for explaining the manufacturing process of the optical module according to the first embodiment.
Figure 16:
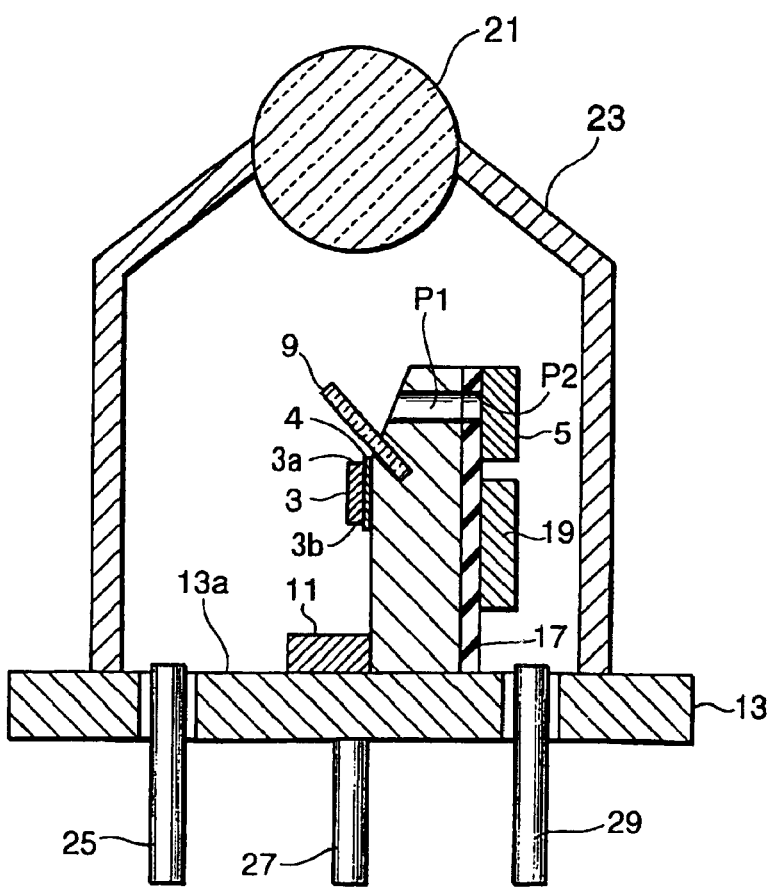

Subsequently, the optical receiver unit 7 is mounted to the second mounting surface S2 of the mount 15 to which the optical transmitter unit has already been mounted (see FIG. 16(a)). At the same time, the opening P2 is aligned with the through-hole P1. With this alignment, the through-hole P1 and the opening P2 are optically coupled to each other. The amplifier 19 and the semiconductor light emitting device 3 are then connected to the lead pins by respective bonding wires. Thereafter, the optical filter 9 is inserted in the slit R1 and fixed in place. The lens holder 23 including the lens 21 is then fixed to the stem 13 after alignment (see FIG. 16(b)). Finally, the optical module 1A thus completed is subjected to inspection. In the inspection, an optical fiber is arranged to lie in the direction in which the light is outputted, as viewed from the lens 21. A driving current is applied to the semiconductor light emitting device 3 through the lead pins, and the output of a laser beam emitted from the end face 3a to the optical fiber is measured. Further, the monitoring current from the second semiconductor light receiving device 11 is measured. An optical module showing the measured values each not smaller than a preset value is subjected to next inspection. In the next inspection, a light exiting from the optical fiber is introduced to enter the lens 21, and an output of the amplifier 19 (which is supplied with electric power through the lead pin) is measured. An optical module showing the measure value not smaller than a preset value is regarded as acceptable.

With the manufacturing method described above, since the optical transmitter unit and the optical receiver unit 7 are separately manufactured and inspected, the optical module 1A can be completed by combining only the acceptable respective units together. Consequently, the yield of manufactured optical modules can be increased.

As described above, the present invention provides an optical module having a structure suitable for a size reduction, and a method of manufacturing such an optical module.

What is claimed is:

1. An optical module for inputting and outputting light in a direction of a predetermined axis, comprising:
    a stem having a principal surface crossing the predetermined axis and a mount disposed on the principal surface, the mount having a first mounting surface extending along a first reference plane which extends in a direction parallel to the predetermined axis crossing the principal surface, a second mounting surface extending along a second reference plane which extends in a direction parallel to the predetermined axis crossing the principal surface, and an optical path defined by a plane laterally extending from the second mounting surface in a direction crossing the predetermined axis, wherein the laterally extending surface defining the optical path is the inner surface of a throughhole extending from the second mounting surface and penetrating through the mount;
    an optical filter attached to the mount, the optical filter having a first surface and a second surface;
    a semiconductor light emitting device disposed on the first mounting surface and emitting light of a first wavelength, the semiconductor light emitting device being optically coupled to the first surface of the optical filter; and
    a semiconductor light receiving device positioned, in alignment with the optical path, on the second mounting surface and being responsive to light of a second wavelength, the semiconductor light receiving device being optically coupled to the second surface of the optical filter through the optical path, thereby receiving the light of the second wavelength from the optical filter.

2. An optical module according to claim 1, wherein the side surfaces of a groove extending from the second mounting surface define the laterally extending surface of the optical path.

3. An optical module according to claim 1, wherein the semiconductor light receiving device includes a rear-illuminated photodiode.

4. An optical module according to claim 1, further comprising a bandpass optical filter for intercepting the light of the first wavelength, the bandpass optical filter being disposed between the second surface of the optical filter and an incident surface of the semiconductor light receiving device.

5. An optical module according to claim 1, wherein the semiconductor light receiving device has a filter portion blocking off the light of the first wavelength.

6. An optical module according to claim 1, further comprising a second semiconductor light receiving device for receiving a monitoring light emitted from the semiconductor light emitting device, the semiconductor light emitting device being positioned between the optical filter and the second semiconductor light receiving device.

7. An optical module according to claim 1, further comprising an amplifier mounted on the second mounting surface and amplifying an electrical signal from the semiconductor light receiving device.

8. An optical module according to claim 7, further comprising an insulating substrate mounting the semiconductor light receiving device and the amplifier thereon and having a light passing portion in alignment with the optical path at the second mounting surface, wherein the insulating substrate is mounted on the second mounting surface.

9. An optical module according to claim 1, further comprising a lens holder for holding a lens optically coupled to the optical filter, wherein the lens holder is mounted on the stem in such a manner as to cover the mount.

10. An optical module according to claim 9, further comprising an optical fiber optically coupled to the lens, a ferrule for holding the optical fiber, a first sleeve for holding the ferrule, and a second sleeve for holding the first sleeve.

11. An optical module for inputting and outputting light in a direction of a predetermined axis, comprising:
    a stem having a principal surface crossing the predetermined axis and a mount disposed on the principal surface, the mount having a first mounting surface extending along a first reference plane which extends in a direction parallel to the predetermined axis crossing the principal surface, a second mounting surface extending along a second reference plane which extends in a direction parallel to the predetermined axis crossing the principal surface, and an optical path defined by a plane laterally extending from the second mounting surface in a direction crossing the predetermined axis, wherein the side surfaces of a groove extending from the second mounting surface define the laterally extending surface of the optical path;
    an optical filter attached to the mount, the optical filter having a first surface and a second surface;
    a semiconductor light emitting device disposed on the first mounting surface and emitting light of a first wavelength, the semiconductor light emitting device being optically coupled to the first surface of the optical filter; and
    a semiconductor light receiving device positioned, in alignment with the optical path, on the second mounting surface and being responsive to light of a second wavelength, the semiconductor light receiving device being optically coupled to the second surface of the optical filter through the optical path, thereby receiving the light of the second wavelength from the optical filter.

* * * * *